US010363650B2

(12) United States Patent
Miyashita et al.

(10) Patent No.: US 10,363,650 B2
(45) Date of Patent: Jul. 30, 2019

(54) DRIVING TOOL

(71) Applicant: MAKITA CORPORATION, Anjo-shi, Aichi (JP)

(72) Inventors: Isao Miyashita, Anjo (JP); Kenichi Miyata, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 420 days.

(21) Appl. No.: 15/294,324

(22) Filed: Oct. 14, 2016

(65) Prior Publication Data
US 2017/0129085 A1    May 11, 2017

(30) Foreign Application Priority Data

Nov. 5, 2015   (JP) ................................. 2015-217785
Sep. 23, 2016  (JP) ................................. 2016-185457

(51) Int. Cl.
*B25C 1/06*     (2006.01)
*B25C 5/15*     (2006.01)
*F16H 19/04*    (2006.01)
*B25C 5/10*     (2006.01)
*B25F 5/00*     (2006.01)

(52) U.S. Cl.
CPC ................. *B25C 1/06* (2013.01); *B25C 5/15* (2013.01); *F16H 19/04* (2013.01); *B25C 5/10* (2013.01); *B25F 5/006* (2013.01)

(58) Field of Classification Search
CPC .. B25C 1/00; B25C 1/008; B25C 1/06; B25C 5/00; B25C 5/15; B25C 5/10; B25C 7/00; B25F 5/001; B25F 5/006

USPC .... 227/8, 120, 129, 131, 132; 173/202, 203, 173/204, 205, 211, 162.1, 124, 216
See application file for complete search history.

(56) References Cited

U.S. PATENT DOCUMENTS

| 3,847,322 | A | * | 11/1974 | Smith | B25C 1/06 227/131 |
|---|---|---|---|---|---|
| 4,215,808 | A | * | 8/1980 | Sollberger | B25C 1/041 173/204 |
| 4,724,992 | A | * | 2/1988 | Ohmori | B25C 1/005 227/132 |
| 4,807,793 | A | * | 2/1989 | Ghibely | B25C 5/15 227/131 |
| 5,320,270 | A | * | 6/1994 | Crutcher | B25C 1/06 173/121 |
| 5,927,585 | A | * | 7/1999 | Moorman | B25C 5/15 173/203 |
| 6,971,567 | B1 | * | 12/2005 | Cannaliato | B25C 1/06 173/1 |

(Continued)

*Primary Examiner* — Scott A Smith
(74) *Attorney, Agent, or Firm* — Oliff PLC

(57) ABSTRACT

In a rack and pinion mechanism 80, a driving-side pinion gear 83 and a driven-side pinion gear 86 are provided to be coaxially rotatable relative to each other within a predetermined angle range. Because of this construction, in a case where a time when a driver 3 reaches an advancing end position and contacts an advancing end damper 19 deviates from a time when a weight device 5 reaches a retracting end position and contacts a moving end damper 7, an excessive external force is not applied to engaging teeth 81a and 82a by relative rotation of the pinion gears 83 and 86. Thus, due to this construction, durability of the rack and pinion mechanism 80, where end impacts are absorbed through elastic deformation, is improved.

9 Claims, 11 Drawing Sheets

(56) References Cited

U.S. PATENT DOCUMENTS

| | | | |
|---|---|---|---|
| 6,997,367 B2 * | 2/2006 | Hu | B25C 1/06 |
| | | | 173/202 |
| 7,134,585 B2 * | 11/2006 | Schiestl | B25C 1/08 |
| | | | 227/9 |
| 7,513,407 B1 | 4/2009 | Chang | |
| 7,815,088 B2 * | 10/2010 | Fielitz | B25C 5/15 |
| | | | 227/129 |
| 8,505,798 B2 * | 8/2013 | Simonelli | B25C 1/008 |
| | | | 173/162.1 |
| 8,556,150 B2 * | 10/2013 | Spasov | B25C 1/06 |
| | | | 227/119 |
| 8,978,953 B2 * | 3/2015 | Blessing | B25C 1/003 |
| | | | 227/156 |
| 9,061,409 B2 * | 6/2015 | Franz | B25C 1/06 |
| 9,302,381 B2 * | 4/2016 | Kondou | B25C 1/06 |
| 9,498,872 B2 * | 11/2016 | Fielitz | B25C 1/06 |

* cited by examiner

DRIVING TOOL

CROSS-REFERENCE

This application claims priority to Japanese patent application serial number 2015-217785, filed on Nov. 5, 2015, and Japanese patent application serial number 2016-185457, filed on Sep. 23, 2016, the contents of which are incorporated herein by reference in their entirety.

TECHNICAL FIELD

The present invention generally relates to a driving tool such as a rechargeable pin tacker.

BACKGROUND ART

Conventionally, in a driving tool such as a pin tacker, which is used mainly for connecting woods or plaster boards, a biasing force of a compression spring or pneumatic cylinder has been used as a driving force. In the former case, an electric motor has been used as the driving source by which a driver (for striking a nail etc.) is retracted to its stand-by position against a spring force (driving force for striking the nail). In this description, driving tools in the former case may be called electric driving tools, whereas driving tools in the latter case may be called pneumatic driving tools.

U.S. Pat. No. 7,513,407 discloses a prior art relating to the electric driving tools. In more detail, the patent document discloses that a rack and pinion mechanism is arranged between a driver for striking a driven member such as a nail, and a weight device for reducing a counterforce, and the weight device is moved in a direction opposite to a driving direction of the driver in order to reduce the counterforce.

According to the counterforce-reducing mechanism of the above prior art, the movement of the driver is synchronized with that of the weight device. However, it is difficult to stop the driver and the weight device simultaneously. That is, in a case where after one of the driver and the weight device stops moving, the other continues to move slightly according to its inertial force. Consequently, a large impact is applied to engaging teeth of the rack and pinion gear, which deteriorates durability of the rack and pinion mechanism. This is especially so, since in the prior art disclosed in the above patent document, no damper is disposed for the driver. Thus, because of this mode of construction, after the weight device is stopped, the driver still moves due to the inertial force, and thus a large undesirable impact is applied to the engaging teeth of the rack and pinion mechanism.

Thus, there is a need in the art to provide a mechanism for reducing an impact by the counterforce applied to the driving tool when the driven member is driven by the driving force, where such a reduction would substantially improving the durability of the rack and pinion mechanism.

SUMMARY

In one exemplary embodiment of the present disclosure, a driving tool may have a driver that strikes a driven member when moved in a driving direction, a weight device that moves in a direction opposite to a moving direction of the driver, and a rack and pinion mechanism that is disposed between the driver and weight device by which the weight device moves in the direction opposite to the moving direction of the driver. Furthermore, the rack and pinion mechanism may include a driving-side rack gear, a driven-side rack gear, a driving-side pinion gear with which the driving-side rack gear is engaged, and a driven-side pinion gear with which the driven-side rack gear is engaged, where the driving-side rack gear and the driven-side rack gear are used for the driver and weight device, respectively. Furthermore, the driving-side pinion gear and the driven-side pinion gear may be coaxially supported so as to be rotatable relative to each other within a predetermined angle range. Furthermore, an elastic member may be interposed between the driving-side pinion gear and the driven-side pinion gear so as to elastically absorb a relative rotation of the driving-side pinion gear with respect to the driven-side pinion gear.

According to the embodiment, the driver and the weight device may move in opposite directions to each other. When one of the driver and the weight device moves, the other may move in an opposite direction. However, it may be assumed that one of the driver and the weight device reaches a moving terminus where it stops moving, after which the other may continue to move due to its inertial force to reach another moving terminus. Even in such a case, by deforming the elastic member that is interposed between the driving-side pinion gear and the driven-side pinion gear to relatively rotate the elastic member, such movement may be allowed. Because of the elastic member, an impact in an engaging direction applied mainly to engaging teeth of the rack and pinion mechanism may be absorbed, and accordingly durability of the rack and pinion mechanism can be improved.

In another exemplary embodiment of the disclosure, the elastic member may be configured to transmit rotation power from the driving-side pinion gear to the driven-side pinion gear.

According to the embodiment, the rotation power may be transmitted by the member between the driving-side pinion gear and the driven-side pinion gear in a state where a relative rotation of the driving-side and driven-side pinion gears may be allowed.

In another exemplary embodiment of the disclosure, a driving tool may have a driver that strikes a driven member when moved in a driving direction, a weight device that moves in a direction opposite to a moving direction of the driver, and a rack and pinion mechanism that is disposed between the driver and the weight device, by which the weight device moves in the direction opposite to the moving direction of the driver. Furthermore, the weight device may be configured to be allowed to continue to move to a moving terminus thereof in a direction opposite to the driving direction after the driver reaches a moving terminus in the driving direction and stops moving.

According to the embodiment, the driver and the weight device may be configured to move in opposite directions to each other via the rack and pinion mechanism. However, according to the embodiment, a movement of the weight device in moving to the moving terminus thereof in a direction opposite to the driving direction may be configured such that the weight device continues to move after the driver reaches its moving terminus and stops moving. Because of this construction, even when the weight device moves to the moving terminus in the direction opposite to the driving direction after the driver reaches the moving terminus in the driving direction and stops moving, an excessive external force is not consequently applied to the rack and pinion mechanism, and thus durability of the rack and pinion mechanism can be improved.

In another exemplary embodiment of the disclosure, the rack and pinion mechanism may include a driving-side rack gear, a driven-side rack gear, a driving-side pinion gear with which the driving-side rack gear is engaged, and a driven-side pinion gear with which the driven-side rack gear is engaged, the driving-side rack gear and the driven-side rack gear being used for the driver and the weight device, respectively. Furthermore, a backlash may be provided at least either between the driving-side rack gear and the driving-side pinion gear or between the driven-side rack gear and the driven-side pinion gear such that the weight device is able to move its moving terminus while an engaging state of engaging gears changes by movement of the weight device in the direction opposite to the driving direction after the driver reaches the moving terminus in the driving direction.

According to the embodiment, either by the backlash between the driving-side rack gear and the driving-side pinion gear or by the backlash between the driven-side rack gear and the driven-side pinion gear, a movement of the weight device alone may be allowed by the inertial force of the weight device after the driver stops moving. Accordingly, an excessive external force is not applied to the rack and pinion gear, and thus durability thereof can be improved. Further, the driving-side pinion gear and the driven-side pinion gear may be configured to be coaxially rotatable to each other within a predetermined angle range, where a single pinion gear that is integrally formed may be adopted to this embodiment.

In another exemplary embodiment of the disclosure, a driving tool may have a driver that strikes a driven member when moved in a driving direction, a weight device that moves in a direction opposite to a moving direction of the driver, and a rack and pinion mechanism that is disposed between the driver and the weight device by which the weight device moves in the direction opposite to the moving direction of the driver. Furthermore, a moving terminus damper may be provided to restrict a moving terminus of the weight device in the direction opposite to the driving direction. In addition, an auxiliary damper may be provided in front of the moving end damper to supply elastic resistance against a movement of the weight device.

According to the embodiment, an elastic resistance (elastic movement resistance) may be applied to the weight device in two-stages comprising the aforementioned dampers in the direction opposite to the driving direction, whereby the inertial force of the weight device may be absorbed. Accordingly, an excessive external force is not applied to the rack and pinion mechanism, and consequently durability of the rack and pinion mechanism is substantially improved.

In another exemplary embodiment of the disclosure, an elastic rubber may be used for the moving end damper, and a leaf spring may be used for the auxiliary damper.

According to the embodiment, while the weight device moves in the direction opposite to the driving direction, the leaf spring as the auxiliary damper may be brought into contact with the weight device and an elastic movement resistance may be applied to the weight device. Accordingly, the inertial force of the weight device in the moving direction may be reduced, and the weight device may subsequently contact the elastic rubber comprising the moving end damper, whereby an impact when the weight device stops may be absorbed. In this way, the inertial force of the weight device in the direction opposite to the driving direction and the impact that the weight device received at its moving terminus may be absorbed by the two stages. Accordingly, an excessive external force may not be applied to the rack and pinion gear, and thus durability thereof can be improved.

In another exemplary embodiment of the disclosure, the rack and pinion mechanism may include a driving-side rack gear, a driven-side rack gear, a driving-side pinion gear with which the driving-side rack gear is engaged, and a driven-side pinion gear with which the driven-side rack gear is engaged, the driving-side rack gear and the driven-side rack gear being used for the driver and the weight device, respectively. Furthermore, the driven-side rack gear may be configured to disengage with the driven-side pinion gear when the weight devices contacts and is subject to the elastic resistance of the auxiliary damper while the weight device moves in the direction opposite to the driving direction.

According to the embodiment, when the weight device contacts and is subject to the elastic resistance of the auxiliary damper while the weight device moves in the direction opposite to the driving direction, the driven-side rack gear may be disengaged with the driven-side pinion gear, and a power transmission route may be cut off. Because of this construction, even in a case where the weight device alone moves to its moving terminus due to its inertial force after the driver stops moving, an excessive external force is not be applied to the rack and pinion mechanism, and thus durability is substantially improved. The driving-side pinion gear and the driven-side pinion gear may be configured to be coaxially rotatable relative to each other within a predetermined angle range, but a single pinion gear that is integrally formed may also be adopted to this embodiment.

In another exemplary embodiment of the disclosure, a moving distance of the driver may be configured to be different from that of the weight device.

According to the embodiment, the degree of freedom in the arrangement of the driver and the weight device can be increased, and compactness of the tool main body can be obtained.

In another exemplary embodiment of the disclosure, the number of teeth of the driving-side pinion gear with which the driving-side rack gear is engaged may be configured to be larger than that of the driven-side pinion gear with which the driven-side rack gear is engaged, and the moving distance of the weight device may be configured to be shorter than that of the driver.

According to the embodiment, a compact mechanism can be obtained in which a necessary moving distance of the driver can be secured and the counterforce when driving a driven member can be absorbed.

DETAILED DESCRIPTION OF EMBODIMENTS

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures, components and/or devices are shown in block diagram form in order to avoid obscuring significant aspects of the exemplary embodiments presented herein.

Figure 1:
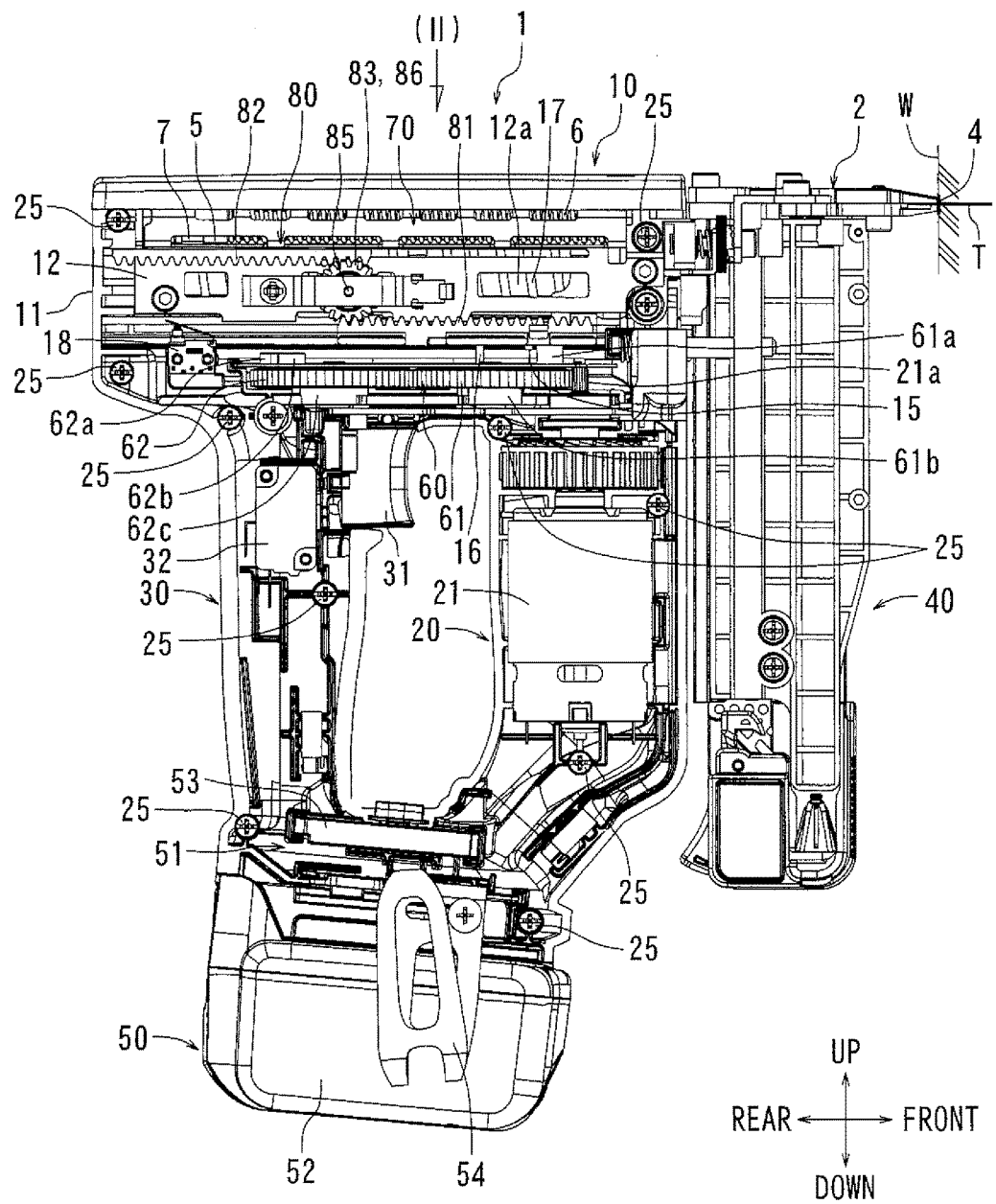
FIG. 1 is an overall side view of a driving tool according to a first exemplary embodiment of the present disclosure.
Figure 2:
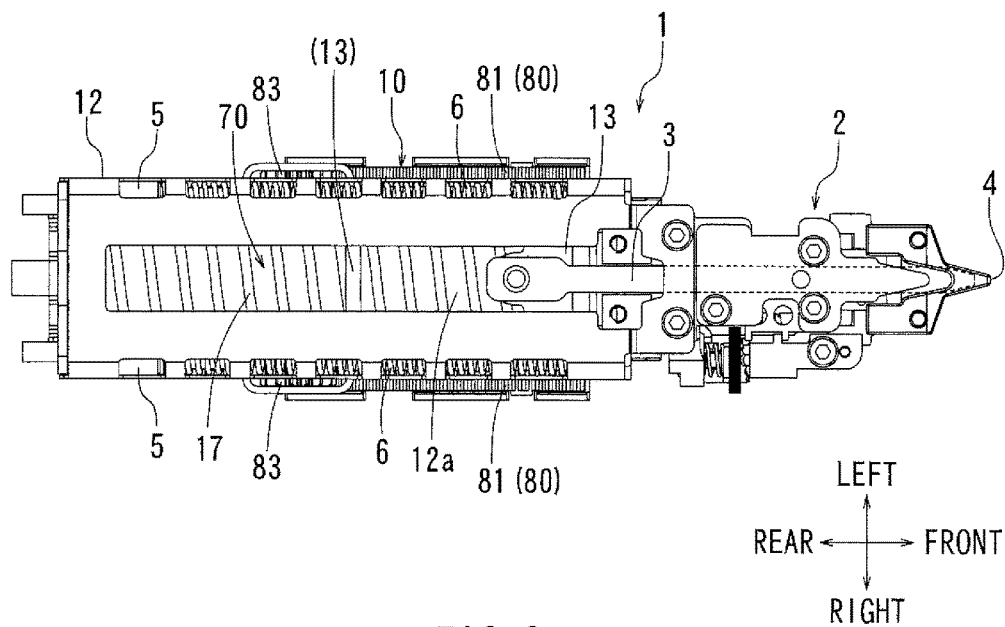
FIG. 2 is a plan view of the driving tool according to the embodiment, which is seen from an arrow (II) in FIG. 1.

Hereinafter, exemplary embodiments of the present teachings will be described with reference to FIGS. 1 to 25. As shown in FIG. 1, a driving tool 1 according to the embodiments may have a tool main body 10, a motor housing 20 in which an electric motor 21 is housed as a driving source, a grip 30 that a user holds, a magazine 40 in which a plurality of driven members such as nails are loaded, and a power source unit 50. Furthermore, the tool main body 10 may be configured such that a driving mechanism 60 and a striking mechanism 70 are provided in a main body housing 11. In the following description, a driving direction in which the driven member is driven may be a forward direction, and a direction opposite to the driving direction may be a rearward direction. Furthermore, a leftward direction and a rightward direction may be based on and relative to a user's position. As shown in FIG. 1, a driven member T may be driven (struck) by an advancement of a driver 3, and the driven member T may be driven into a driven material (workpiece) W.

Figure 4:
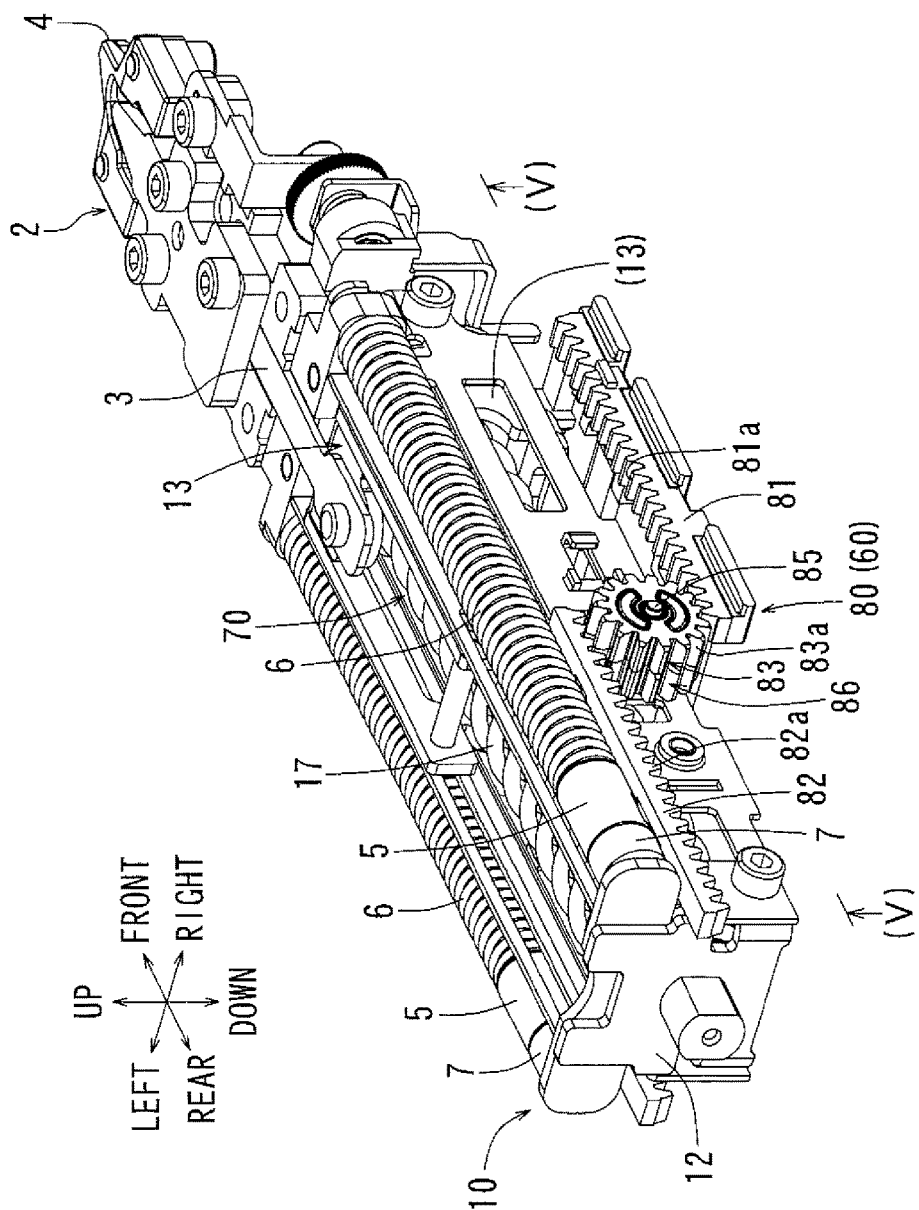
FIG. 4 is a perspective view showing the driving mechanism and the striking mechanism.

As shown in FIGS. 1 and 4, a nose 2 may be provided in a front part of the tool main body 10. The driver 3 for driving the driven member T may be advanced through a driving passage of the nose 2 to drive the driven member T, which may be driven out of an ejection exit 4 located at a tip of nose 2. The nose 2 may be configured to be movable within a predetermined range in a forward and rearward direction (driving direction) with respect to the tool main body 10. A driving operation may be configured to be performed (the driven member T may be driven) only when the ejection exit 4 is pushed against the driven material (workpiece) W and the nose 2 is relatively retracted with respect to the driven material (workpiece) W. When the nose 2 is retracted, one driven member T may be driven out of the ejection exit 4 and driven into the driven material (workpiece) W. The retraction movement of the nose 2 may be detected by a nose sensor (not shown).

The electric motor 21 may be run when a trigger-type switch lever 31, which is located on an upper front face of the grip 30 as shown in FIG. 1, is pulled by a fingertip of the user while the nose 2 is being retracted as described above. The driver 3 may then be retracted and/or returned to a retreat end position thereof by the driving mechanism 60 that is driven by the electric motor 21. A main switch 32 may be housed at the rear of the switch lever 31. The main switch 32 may be turned on by pulling the switch lever 31 to run the electric motor 21. When the pulling operation of the switch lever 31 is released, the main switch 32 may be turned off to stop the electric motor 21. Furthermore, even in a condition where the switch lever 32 is being pulled, if an on-signal is output from a retreat end sensor, which is described later, the electric motor 21 may be automatically stop after a predetermined time is passed.

As shown in, for example, FIGS. 1 to 4, a main frame 12 may be fixed inside the main body housing 11. A striking frame 13 and a weight base 14 may be provided in the main frame 12 such that the striking frame 13 and the weight base 14 can be independently moved in the forward and rearward direction. A round-bar-shaped support shaft 12a may extend between a front and rear part of the main frame 12. The striking frame 13 may be supported via the support shaft 12a such that the striking frame 13 can be moved in the forward and rearward direction concomitantly with the support shaft 12a. A rear part of the driver 3 may be joined to an upper part of the striking frame 13. Furthermore, a striking (hitting) spring 17 may be loaded surrounding the support shaft 12a between the rear part of the striking frame and the rear part of the driver 3. The striking frame 13 may be biased by the striking spring 17 in an advancing direction (driving direction). The biasing force by the striking spring 17 may become a driving force of the driver 3, i.e., a striking force applied to the driven member T. Because of this construction, a compression coil spring with a relatively large diameter and also a relatively large winding diameter may be used for the striking spring 17.

A pair of rack and pinion mechanisms 80 may be provided between the striking frame 13 and the weight base 14. The striking frame 13 and the weight base 14 may move in opposite directions with respect to each other via the rack and pinion mechanism 80. The driving mechanism 60 and the striking mechanism 70 may be provided in the striking frame 13. The rack and pinion mechanism 80 is described infra.

As shown in FIG. 1, the driving mechanism 60 may have a first driving gear 61 and a second driving gear 62, each of which is a spur gear. The first driving gear 61 and the second driving gear 62 may be rotatably supported by a lower part of the main body housing 11 via a support shaft 61b and 62c, respectively. Rotation of the electric motor 21 may be output at reduced speed and the reduced rotation power may be output to an output gear 21a. The output gear 21a may be engaged with the first driving gear 61. Furthermore, the first driving gear 61 may be engaged with the second driving gear 62. Because of this construction, when the electric motor 21 runs, this causes the first driving gear 61 to rotate, and the first driving gear rotation causes the second driving gear 62 to rotate in a direction opposite to the first driving gear 61.

Figure 5:
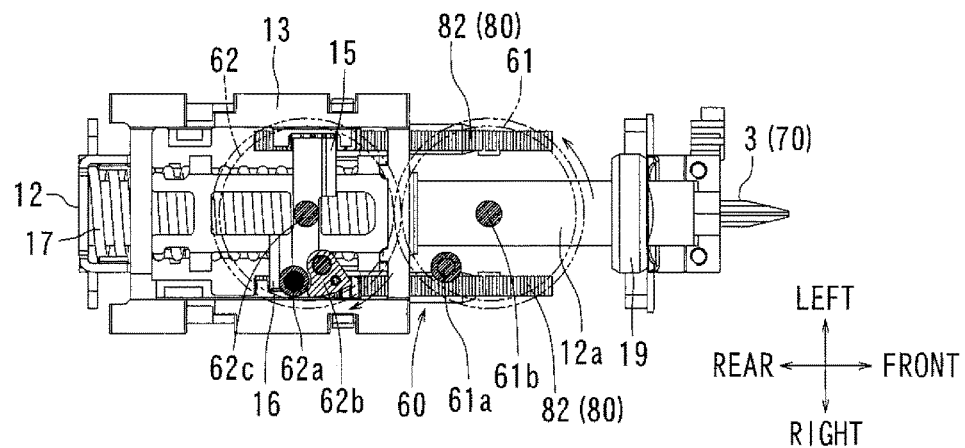
FIG. 5 is a figure explaining an operation of the driving mechanism. This figure shows an initial state of the rack and pinion mechanism, in which a striking frame is retracted short of a retreat end position of the striking frame. Furthermore, this figure shows the rack and pinion mechanism seen from below, taken along arrow (V)-(V) in FIG. 4.

As shown in, for example, FIG. 1 and FIG. 5, a first engaging roller 61a may be supported on an upper face of the first driving gear 61 such that the first engaging roller 61a rotates around the support shaft 61b. Furthermore, a second engaging roller 62a may be supported on an upper face of the second driving gear 62 such that the second engaging roller 62a rotates around the support shaft 62c. Furthermore, an auxiliary engaging portion 62b may be provided on the upper face of the second driving gear 62 proximate to the second engaging roller 62a. As shown in FIG. 1, the first engaging roller 61a may be configured to have the same diameter as that of the second engaging roller 62a, and may be configured to be taller (longer in an axis direction) than the second engaging roller 62a. The auxiliary engaging portion 62b may have the same height as that of the second engaging roller 62a.

As shown in FIG. 1 and FIGS. 5 to 10, a first engaging portion 15 and a second engaging portion 16 may be provided extending downward from a lower face of the striking frame 13 such that the first engaging portion 15 and the second engaging portion 16 are spaced apart at a predetermined interval in the forward and rearward direction. The first engaging portion 15 may be arranged in an approximately left-half area of the striking frame 13, and the second engaging portion 16 may be arranged in an approximately right-half area of the striking frame 13. Furthermore, the first and second engaging portions 15 and 16 may be arranged in parallel with each other. As shown in FIG. 1, the first and second engaging portions 15 and 16 may extend downward but the extending length may differ from each other. In particular, the extending length of the first engaging portion 15 may be configured to be smaller than that of the second engaging portion 16. Because of this construction, as shown in FIG. 1, the first engaging roller 61a may be engaged with the first engaging portion 15, but the second engaging roller 62a may not be engaged with the first engaging portion 15. The second engaging roller 62a may be engaged with only the second engaging portion 16 that extends longer than the first engaging portion 15 in the downward direction.

In an initial state shown in FIG. 5, the nose 2 may be pushed against the driven material (workpiece) W (where the nose and workpiece are as shown in FIG. 1) to be relatively retracted. By pulling the switch lever 31 in this retracted state, the electric motor 21 may be run. The first driving gear 61 and the second driving gear 62 may rotate by rotation of the electric motor 21, and then the striking frame 13 may be retracted from an initial position to perform an striking operation (to strike a nail). After the striking operation, the electric motor 21 may rotate for a predetermined period, and the striking frame 13 may be returned to the initial state shown in FIG. 5. FIGS. 5 to 10 show a series of movements of the striking frame 13 when one striking operation is performed. FIG. 5 shows the initial state in which the striking frame 13 is located short of the retreat end position thereof (initial position). In this initial state, the driver 3 may be located a little short of the retreat end position thereof.

Figure 6:
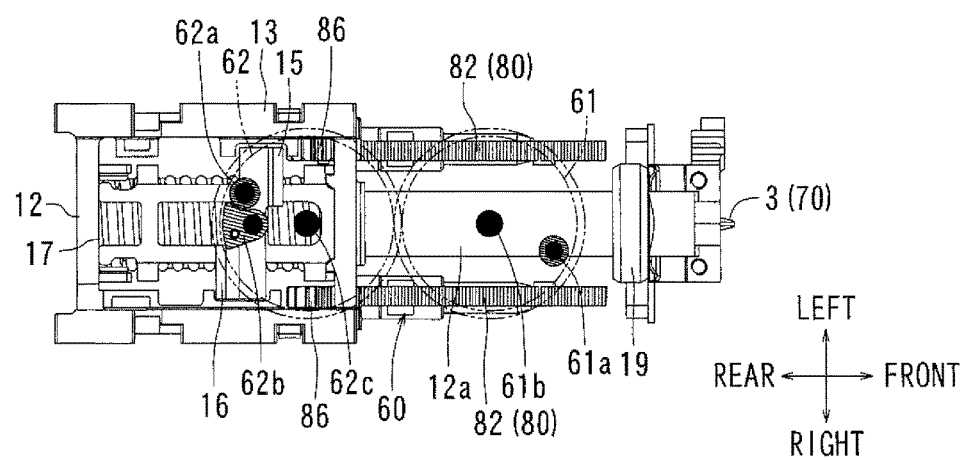
FIG. 6 is another figure explaining an operation of the driving mechanism, which shows a state in which the striking frame is retracted to the retreat end position of the striking frame and also a state just before a second driving gear is disengaged with a second engaging portion.

Furthermore, in the initial state shown in FIG. 5, the second engaging roller 62a may be brought into contact with a front surface side of the second engaging portion 16. When the electric motor 21 is run, the first driving gear 61 may rotate counterclockwise and the second driving gear 62 may rotate clockwise. This results in the striking frame 13 becoming furthermore retracted. FIG. 6 shows a state just before the striking frame 13 reaches the retreat end position thereof. In this state shown in FIG. 6, the auxiliary engaging portion 62b may be located just before being disengaged with the second engaging portion 16. When the striking frame 13 reaches the retreat end position thereof after the state shown in FIG. 6, the auxiliary engaging portion 62b may be disengaged with the second engaging portion 16. At the moment when the auxiliary engaging portion 62b is disengaged with the second engaging portion 16, the striking frame 13 may advance by the biasing force of the striking (hitting) spring 17, and the driver 3 may advance through the driving passage of the nose 2. During the advancement of the driver 3 through the driving passage of the nose 2, one driven member T may be driven into the driven material (workpiece) W by the driver 3.

Figure 7:
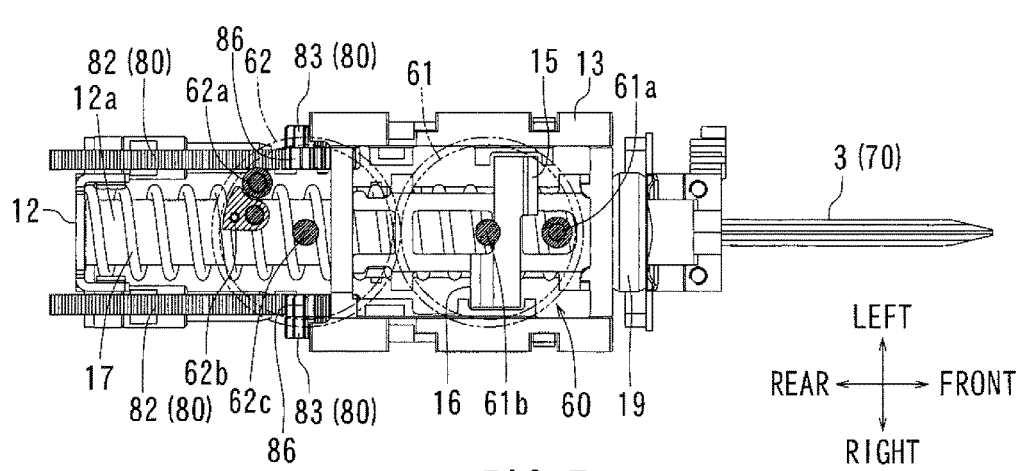
FIG. 7 is another figure explaining an operation of the driving mechanism, which shows a state in which the striking frame is advanced to an advancing end position of the striking frame to perform a striking operation (a nail is driven).

An advancing (front) end damper 19 may be attached to a front part of the main frame 12. Because of this construction, as shown in FIG. 7, the striking frame 13 may be brought into contact with the advancing end damper 19 to reach the advancing end position. The striking frame 13 may stop at the advancing end position by contacting the advancing end damper 19, where the impact of the striking frame 13 on advancing end damper 19 upon contact may be absorbed by an elastic deformation of the advancing end damper 19.

The retreat end position of the striking frame 13 may be detected by a retreat end sensor 18 shown in FIG. 1. When the striking frame 13 is detected to have reached the retreat end position by the retreat end sensor 18, the electric motor 21 may stop after a predetermined time is passed based on the output signal from the retreat end sensor 18. During this time, the striking frame 13 may be returned to the initial state as shown in FIG. 5. In a driving stage where the striking frame 13 advances by the biasing force of the striking spring 17, the electric motor 21 may run, but the rotational force from the electric motor 21 is not transferred to the striking frame 13 (the electric motor 21 may be dynamically separated with the striking frame 13) because the first engaging roller 61a is not engaged with the first engaging portion 15 and also the second engaging roller 62a and the auxiliary engaging portion 62b are not engaged with the second engaging portion 16. Because of this construction, the driver 3 may strike (hit) the driven member T with a sufficient striking force caused by the biasing force of the striking spring 17 without receiving a dynamic force from the driving mechanism 60 as a resisting power.

Figure 8:
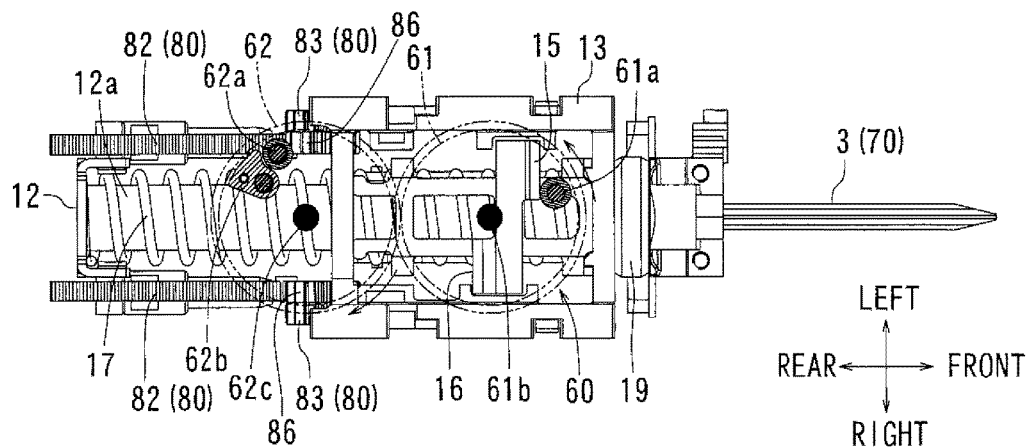
FIG. 8 is another figure explaining an operation of the driving mechanism, which shows a state in which a first driving gear starts to be engaged with a first engaging portion after the driving frame is advanced to the advancing end position of the driving frame.
Figure 9:
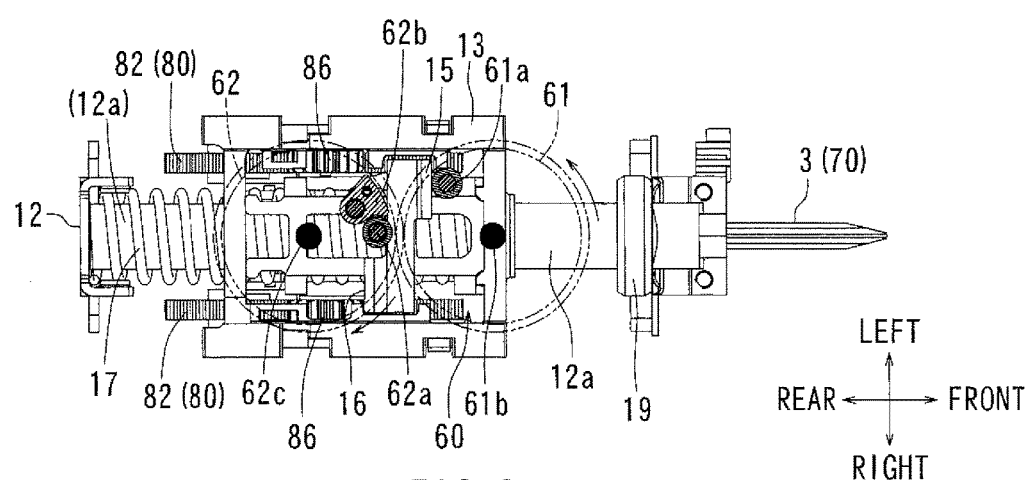
FIG. 9 is another figure explaining an operation of the driving mechanism, which shows a state in which the striking frame is being retracted from the advancing end position of the striking frame by rotation of the first driving gear.
Figure 10:
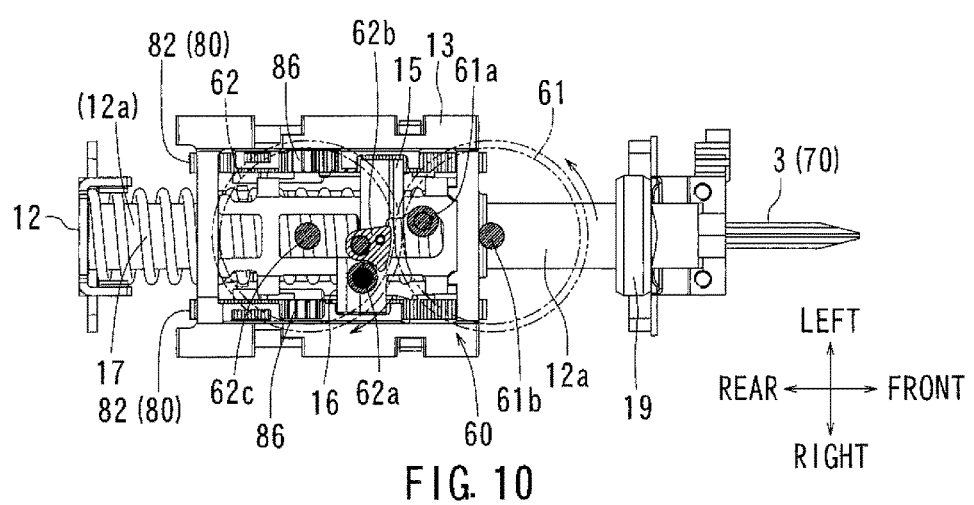
FIG. 10 is another figure explaining an operation of the driving mechanism, which shows a state in which the second driving gear is engaged with the second engaging portion of the striking frame and the striking frame is being retracted from the advancing end position of the striking frame, which also shows a state just before the rack and pinion mechanism is returned to the initial state.

After the driven member T is struck (hit), the electric motor 21 may still run, and accordingly the first driving gear 61 may rotate counterclockwise and the first engaging roller 61a may be brought into contact with the front surface of the first engaging portion 15 as shown in FIG. 8. The first driving gear 61 may furthermore rotate counterclockwise with the first engaging roller 61a being contacted with the front surface of the first engaging portion 15. As a result, the striking frame 13 may start to be retracted against the striking spring 17. When the first driving gear 61 rotates counterclockwise and the striking frame 13 is retracted further, the first engaging roller 61a may be disengaged with the first engaging portion 15 while the second engaging roller 62a simultaneously begins to engage with the front surface of the second engaging portion 16, as shown in FIG. 10. Because of this construction, the second engaging portion 16, and consequently the striking frame 13, may be further pushed rearward by the second engaging roller 62a by the first driving gear 61 rotating counterclockwise, which in turn rotates the second driving gear 62 clockwise as indicated by arrows in the figures. Accordingly, the striking frame 13 is further retracted against the biasing force of striking spring 17.

In this way, the retraction movement of the striking frame 13 may occur in two phases which overlap, where the second phase begins when the first phase ends, from the first engaging roller 61a of the first driving gear 61 to the second engaging roller 62a of the second driving gear 62. As a result, in combination, the striking frame 13 may be retracted with a large stroke. As shown in FIG. 10, the first driving gear 61 and the second driving gear 62 may further rotate as indicated by arrows, and the driving frame 13 may be further retracted against the striking spring 17. Finally, the striking frame 13 may be returned to the initial position as shown in FIG. 5. At this time, the electric motor 21 is stopped automatically.

Figure 3:
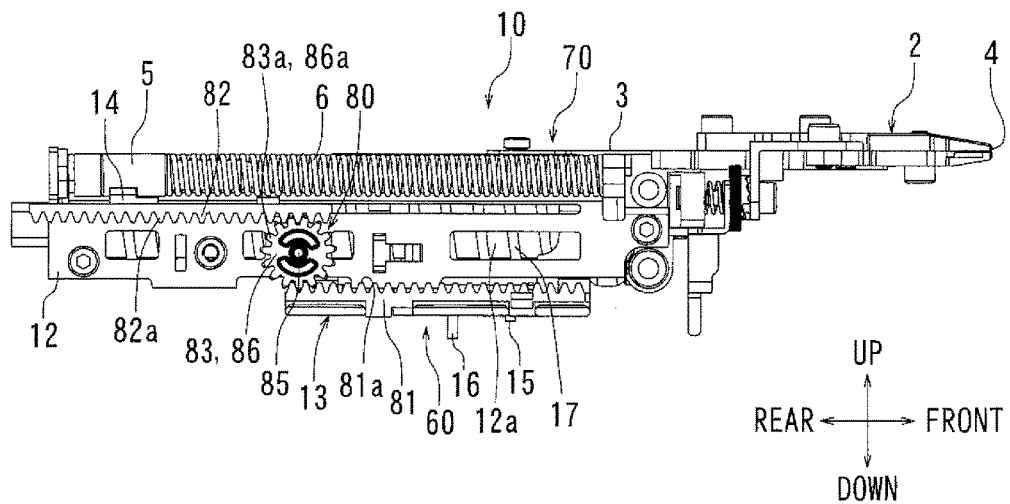
FIG. 3 is a side view showing a driving mechanism and a striking mechanism.

A counterforce caused by the striking operation of the driver 3 may be absorbed by a pair of weight devices 5 that may be moved in a direction opposite the driving direction. As shown in FIGS. 3 and 4, the pair of weight devices 5 may be supported on the weight base 14. The weight base 14 may be supported so as to be movable in the forward and rearward direction with respect to the main frame 12. Cylindrical-shaped weight devices 5 may be mounted to the upper surface of the left and right side of the weight base 14, respectively. Furthermore, a return spring 6 may be interposed between each weight device 5 and the front portion of the main frame 12, respectively. Each weight device 5 may be biased in the retracting direction by this return spring 6. In other words, the biasing direction caused by the striking spring 17, by which the striking frame 12 is biased in the forward direction, may be configured to be opposite to that of the return spring 6.

A retracting end damper 7, which is formed in a cylindrical shape and has roughly the same diameter as the weight devices 5, may be attached to the rear surface of each of the weight devices 5, respectively. The retracting end damper 7 may be made of rubber having appropriate elasticity. The retracting end position of each weight device 5 may be restricted by the corresponding retracting end damper 7 being brought into contact with the rear surface of the main frame 12. The resulting impact by the biasing spring 6 when the weight devices 5 reach the retracting end position may be absorbed by the dampers 7.

The moving direction of the left and right weight devices 5 may be opposite to that of the driver 3. Furthermore, the weight devices 5 may move in synchronization with the driver 3. Because of this construction, the counterforce applied to the driving tool 1 which is caused by the driving operation of the driven member T into the driven material (workpiece) W by the driver 3, may be absorbed. In order to move the left and right weight devices 5 in the direction opposite the driver 3 and also in synchronization with the driver 3, a pair of rack and pinion mechanisms 80 may be provided between the weight base 14 and the striking frame 13. The left and right rack and pinion mechanisms 80 may have the same structure, and thus in the following description, the right rack and pinion mechanism 80 shown in the figures is described.

The rack and pinion mechanism 80 may have a driving-side rack gear 81, a driven-side rack gear 82, a driving-side pinion gear 83 that is engaged with the driving-side rack gear 81, and a driven-side pinion gear 86 that is engaged with the driven-side rack gear 82. The driving-side rack gear 81 may be attached along the lateral portion of the striking frame 13. Furthermore, the driven-side rack gear 82 may be joined to the lateral side of the weight base 14. Because of this construction, the driving-side rack gear 81 may be arranged so as to be movable in the forward and rearward direction along the lower portion of the main frame 12, and the driven-side rack gear 82 may be arranged so as to be movable in the forward and rearward direction along the upper portion of the main frame 12. As shown in FIG. 4, engaging teeth of the driving-side rack gear 81 may face upward and those of the driven-side rack gear 82 may face downward. Furthermore, the driving-side rack gear 81 and the driven-side rack gear 82 may be arranged offset with respect to each other in the left and right direction. The driving-side pinion gear 83 and the driven-side pinion gear 86 may be coaxially supported relative to each other via a shaft support 85 extending from the lateral side of the main frame 12. Furthermore, the driving-side pinion gear 83 and the driven-side pinion gear 86 may be supported so as to be rotatable within a predetermined angle range with respect to each other.

In the rack and pinion mechanism 80, the driving-side rack gear 81 may be indirectly engaged with the driven-side rack gear 82 via the driving-side pinion gear 83 and the driven-side pinion gear 86, and thus the main frame 12 may synchronously move in a direction opposite the direction in which the weight base 14 moves. Because of this construction, in a stage where the striking frame 13 is retracted by the driving mechanism 60 from the advancing end position of the frame shown in FIG. 7 to the retreat end position of the frame immediately after a position shown in FIG. 10, the weight device 5 may advance against the biasing force of the return spring 6 from the retreat end position of the weight device (a position corresponding to the advancing end position of the frame in which the weight device 5 contacts the retracting end damper 7) toward the advancing end position of the weight device, corresponding to the retreat end position of the frame. Furthermore, in a stage where the striking frame 13 advances from the retreat end position of the striking frame immediately after the position shown in FIG. 10, the weight device 5 may be retracted from its advancing end position by the biasing force of the return spring 6.

In the present embodiment, a method may be adopted such that an excessive external force may not be applied especially to the teeth of the rack and pinion mechanism 80 by moving only the weight device 5, in a case where the time when the driving frame 13 contacts the advancing end damper 19 and reaches the advancing end position thereof slightly deviates from the time when the weight device 5 contacts the retracting end damper 7 and reaches the retreat end position thereof, i.e., in a case where the weight device 5 reaches the retreat end position of the weight device slightly after the striking frame 13 reaches the advancing end position of the striking frame.

Figure 11:
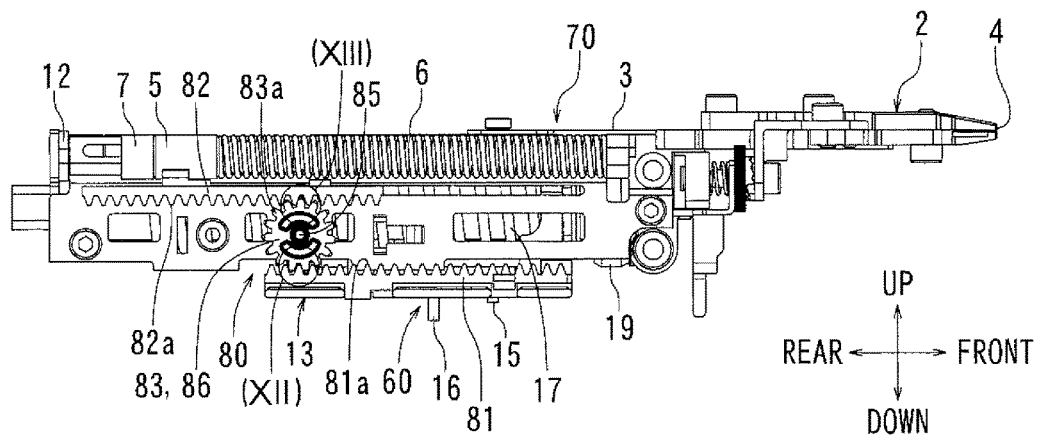
FIG. 11 is a side view of the driving mechanism and the striking mechanism, showing a state in which the driver is moving in a forward direction.
Figure 12:
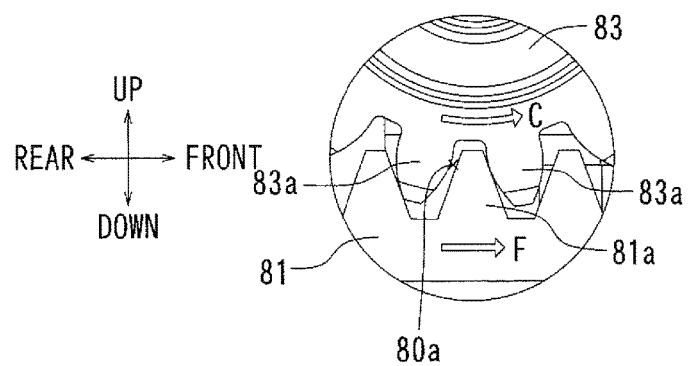
FIG. 12 is an enlarged view of (XII) in FIG. 11, which is a side view showing an engaging state of a driving-side pinion gear with a driving-side rack gear.

FIG. 11 shows a condition of the rack and pinion mechanism 80 and other members immediately before the striking frame 13 reaches the advancing end position thereof. In this stage, there may be a gap between the front part of the striking frame 13 and the advancing end damper 19. Furthermore, there may be a larger gap between the retracting end damper 7 and the rear part of the main frame 12. FIG. 12 shows an engaging state of the engaging teeth of the driving-side pinion gear 83 with respect to the engaging teeth of the driving-side rack gear 81. Furthermore, FIG. 13 shows an engaging state of the engaging teeth of the driven-side pinion gear 86 with respect to the engaging teeth of the driven-side rack gear 82.

As shown in FIG. 12, the engaging teeth 81a of the driving-side rack gear 81 may contact (be engaged with) the engaging teeth 83a of the driving-side pinion gear 83. With this contacting state, the driving-side rack gear 81 may advance in a direction indicated by an arrow F, and accordingly the driving-side pinion gear 83 may rotate in a direction indicated by an arrow C. As shown in FIG. 12, there may be a gap 80a between the engaging teeth 81a of the driving-side rack gear 81 and the engaging teeth 83a of the driving-side pinion gear 83, where the gap 80a is located at the rear side of the engaging teeth 81a. Because of this construction, a backlash corresponding to the gap 80a (a rattling in an engaging direction; the same definition will apply hereinafter throughout the description) may be generated between the driving-side pinion gear 81 and the driving-side pinion gear 83.

Figure 13:
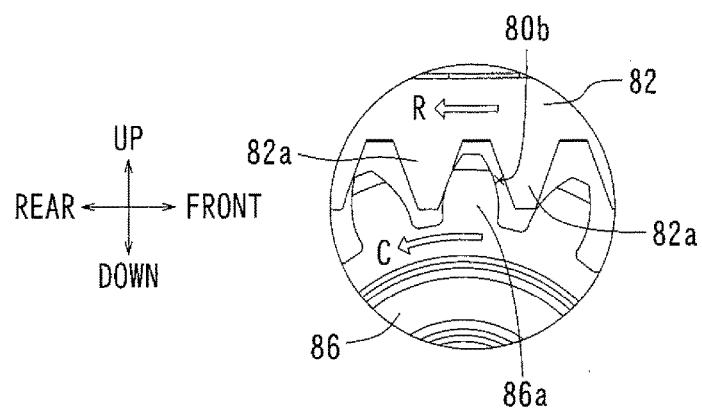
FIG. 13 is an enlarged view of (XIII) in FIG. 11, which is a side view showing an engaging state of a driven-side pinion gear with a driven-side rack gear.

Furthermore, as shown in FIG. 13, the engaging teeth 86a of the driven-side pinion gear 86 may contact a front portion of the engaging teeth 82a of the driven-side rack gear 82. With this contacting state, the driven-side pinion gear 86 may rotate in a direction indicated by an arrow C, and accordingly the driven-side rack gear 82 may be pushed by the engaging teeth 82a of the driven-side pinion gear 86 in a retracting direction indicated by an arrow R. Then, the driven-side rack gear 82 may be retracted. As shown in FIG. 13, there may be a gap 80b between the engaging teeth 86a of the driven-side pinion gear 86 and the engaging teeth 82a of the driven-side rack gear 82, where the gap 80b is located at the front side of the engaging teeth 86a. Because of this construction, a backlash corresponding to the gap 80b may be generated between the driven-side pinion gear 86 and the driven-side rack gear 82.

Figure 14:
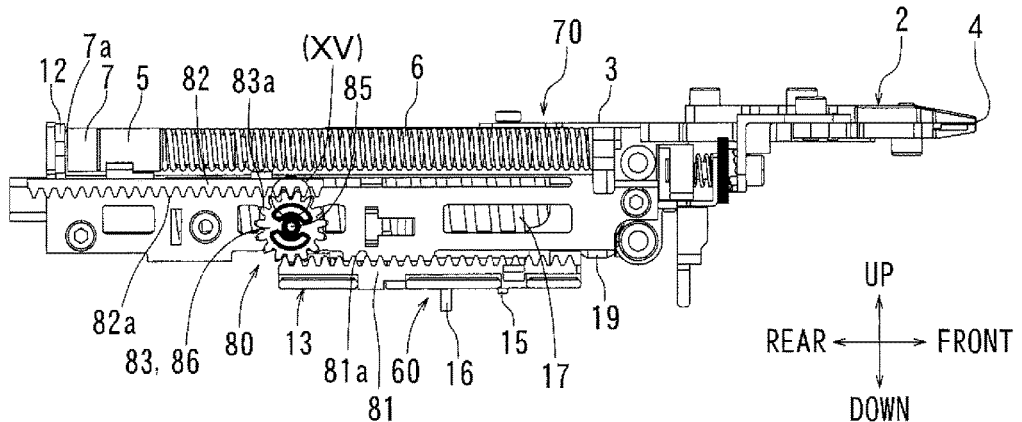
FIG. 14 is a side view of the driving mechanism and the striking mechanism, showing a state just before the weight device is retracted to the retreat end position thereof after the driver reaches the advancing end position thereof.
Figure 15:
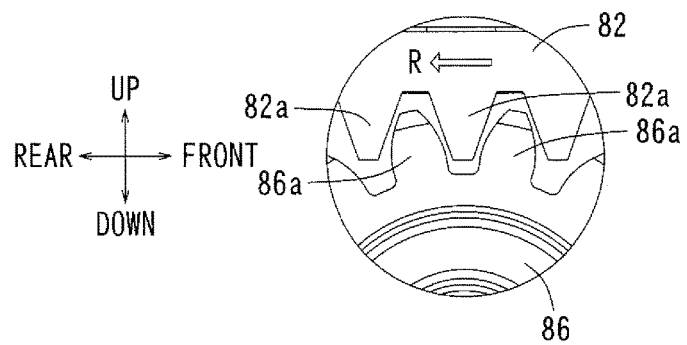
FIG. 15 is an enlarged side view of (XV) in FIG. 14, showing a state in which the driven-side pinion gear is engaged with the driven-side rack gear.

The striking frame 13 may advance further in this manner and contact the advancing end damper 19. Here, as shown in FIG. 14, an advancing movement of the striking frame 13 may stop. However, even when the striking frame 13 contacts the advancing end damper 19 and stops moving at its advancing end position, at that moment the weight device 5 has not reached its retreat end position as shown in FIG. 14. In other words, a slight gap (an idle traveling distance) 7a still remains between the rear part of the main frame 12 and the retracting end damper 7.

Figure 16:
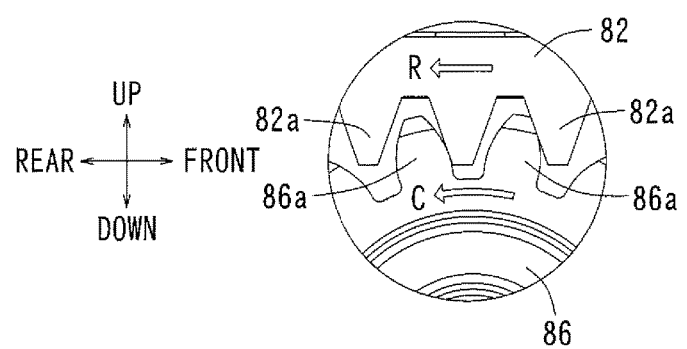
FIG. 16 is a side view showing a state in which the driven-side pinion gear is engaged with the driven-side rack gear when the weight device reaches the retreat end position thereof.
Figure 17:
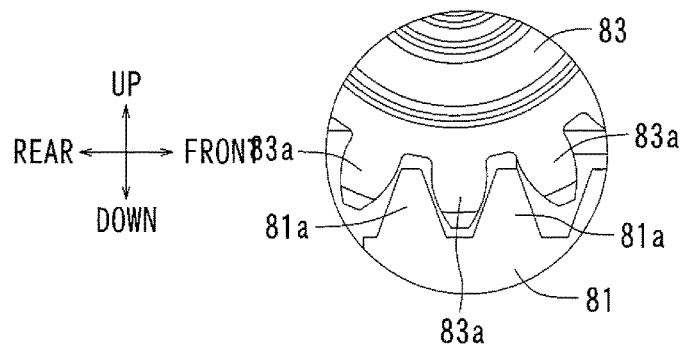
FIG. 17 is a side view showing a state in which the driving-side pinion gear is engaged with the driving-side rack gear when the weight device reaches the retreat end position thereof.

Because of this construction, when the striking frame 13 reaches its advancing end position (the initial position), the weight device 5 may be furthermore retracted by the idle traveling distance 7a mainly by the biasing force of the return spring 6. In this stage, the driving-side rack gear 81 and the driving-side pinion gear 82 may remain in an engaging state shown in FIG. 12, and both the gears 81 and 82 may not move. Furthermore, in this stage, only the driven-side rack gear 82 may be retracted with respect to the driven-side pinion gear 86. Because of this movement, an engaging state shown in FIG. 13 may transition to an engaging state shown in FIG. 15, and then subsequently, as shown in FIG. 16, the engaging teeth 82a of the driven-side rack gear 82 may be move rearward from the contacted engaging tooth 86a it was previously engaging and it then may next engage the adjacent engaging tooth 86a on the front side in the rotational direction C.

The engaging teeth 82a of the driven-side rack gear 82 may be brought into contact with the front side of the engaging teeth 86a of the driven-side pinion gear 86, and then as the driven-side rack gear 82 may be retracted furthermore in the direction indicated by the arrow R, the engaging teeth 86a may be pushed rearward by the teeth 82a and the driven-side pinion gear 86 may be slightly rotated in the direction indicated by the arrow C. Consequently, according to a slight rotation of the driven-side pinion gear 86 in the direction indicated by the arrow C, an engaging state of the driving-side pinion gear 83 with respect to the driving-side rack gear 81 may transition from a state shown in FIG. 12 to a state shown in FIG. 17. In the state shown in FIG. 17, due to the slight rotation of the driven-side pinion gear 86 in the direction indicated by the arrow C, the engaging teeth 83a of the driving-side pinion gear 83 may be slightly moved in the forward direction such that the engaging teeth 83a may be located between the abutted teeth 81a such that they do not contact the abutted teeth 81a. At a maximum, an idling rotation of the driving side pinion gear 83 in the direction indicated by the arrow C (a movement of the engaging teeth 83a in the forward direction) may be configured within a range such that the backlash 80a shown in FIG. 12 may be cancelled.

In this way, in the present embodiment, while the engaging teeth 82a of the driven-side rack gear 82 moves (idles) in the retracting direction with respect to the engaging teeth 86a of the driven-side pinion gear 86 and contacts the front side of the engaging teeth 86a (sequentially shown as FIG. 13→FIG. 15→FIG. 16) and also the driven-side pinion gear 86 is pushed by the driven-side rack gear 82 such that the driving-side pinion gear 83 moves (idles) (sequentially shown as FIG. 12→FIG. 17), the backlash 80b between the engaging teeth 82a and 86a may be configured to be adequately large such that the weight device 5 can reach the retracting end position thereof. In the present embodiment, the backlash 80a between the engaging teeth 81a of the driving-side rack gear 81 and the engaging teeth 83a of the driving-side pinion gear 83 and the backlash 80b between the engaging teeth 82a of the driven-side rack gear 82 and the engaging teeth 86a of the driven-side pinion gear 86 may both be configured to be larger than a backlash of the normally-used involute gear. In order to set the backlashes 80a and 80b larger than the normally-used involute gear, a pressure angle, a pitch, and a module etc. of the driving-side rack gear 81, the driven-side rack gear 82, the driving-side pinion gear 83, and driven-side pinion gear 86 may be appropriately set. Because of these settings, after the striking frame 13 reaches its advancing end position (the initial position), the driving-side pinion gear 83 and the drive-side pinion gear 86 may move (idle) in the direction indicated by the arrow C as shown in FIG. 12→FIG. 13→FIG. 15→FIG. 16→FIG. 17, and the retracting movement of the weight device 5 (an idle traveling distance 7a) may be absorbed. Accordingly, an excessive external force may not be applied to engaging teeth 81a, 82a, 83a, and 86a of the rack and pinion mechanism 80.

As described above, after the striking frame 13 reaches its advancing end position and the driven member T is driven into the driven material (workpiece) W, the weight device 5 may be retracted by merely the idle traveling distance 7a to reach the retreat end position, and an excessive external force may not be applied to the rack and pinion mechanism 80. Because of this construction, a counterforce applied to the driving tool 1 when the driven member is driven into the driven material (workpiece) W can be safely and reliably absorbed. Thus, because of its construction, durability against the counterforce and also operability of the driving tool 1 can be improved.

Figure 18:
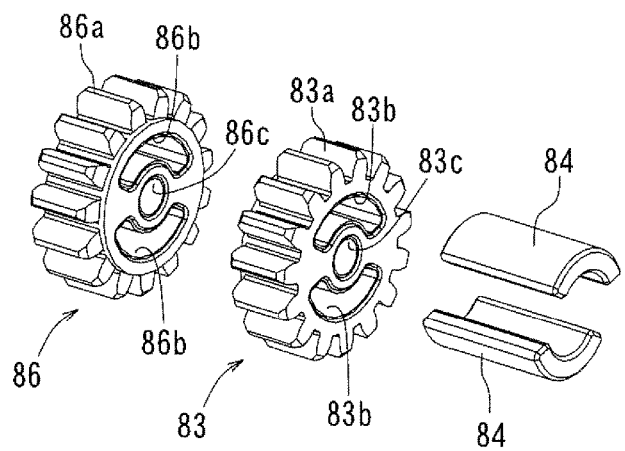
FIG. 18 is an exploded perspective view of the driven-side and driving-side pinion gears.

Furthermore, another method to absorb the counterforce more safely and reliably may be adopted in the present embodiment. As shown in FIG. 18, a counterforce adoption function may be provided between the driving-side pinion gear 83 and the driven side pinion gear 86. As described above, the driving-side pinion gear 83 and the driven-side pinion gear 86 may be rotatably coaxially supported relative to with each other within a predetermined angle range via the support shaft 85. Furthermore, in the present embodiment, the gear diameter and the number of teeth of the driving-side pinion gear 83 may be the same as those of the driven-side pinion gear 86. The driving-side pinion gear 83 may be engaged with the driven-side pinion gear 86. As shown in FIG. 18, the driving-side pinion gear 83 and the driven-side pinion gear 86 may be provided with two arc-shaped retention holes 83b and 86b, respectively. In the driving-side pinion gear 83, the two retention holes 83b may be arranged opposite to each other around the support hole 83c through which the support shaft 85 is passed. Similarly, in the driven-side pinion gear 86, the two retention holes 86b may be arranged opposite to each other around the support hole 86c through which the support shaft 85 is passed.

By passing the support shaft 85 through the retention holes 83c and 86c, the driving-side pinion gear 83 and the driven-side pinion gear 86 may be coaxially supported relatively to each other. As shown in FIG. 18, an elastic member 84 may be inserted to each of the two retention holes 83b of the driving-side pinion gear 83 and also each of the two retention holes 86b of the driven-side pinion gear 86. Each elastic member 84 may be inserted straddling the retention hole 83b of the driving-side pinion gear 83 as well as the retention hole 86b of the driven-side pinion gear 86. Each elastic member 84 may be made from rubber and have an appropriate elasticity. By using these rubber elastic members 84, an element of elasticity is introduced between the driving-side pinion gear 83 and the driven-side pinion gear 86 in a direction relatively rotatable with each other.

As described above, through the elastic members 84, elasticity may be obtained between the driving-side pinion gear 83 and the driven-side pinion gear 86 in a direction relatively rotatable with each other. Because of this construction, in the driving-side rack gear 81 and the driven-side rack gear 82 that synchronously move with each other, a state can be elastically allowed such that one of the driving-side and driven-side rack gears 81 and 82 is stopped and the other moves. With regard to the driving-side pinion gear 83 and the driven-side pinion gear 86, after the striking frame 13 stops at its advancing end position, the driving-side pinion gear 83 and the driven-side pinion gear 86 may be rotatably moved relative to each other by elastically deforming the elastic members 84. By this movement, an excessive external force may be absorbed and prevented from being applied to the rack and pinion mechanism 80, and also a longer idle traveling distance 7a of the weight device 5 may be obtained. In this respect, the counterforce caused by the striking operation of the driver 3 may be absorbed more safely and reliably.

As shown in FIG. 1, the grip 30 may extend downward from the rear part of the lower surface of the tool main body 10 having an appropriate length and thickness such that it is easy for a user to hold. A power supply unit 50 may be provided at the lower terminus of the grip 30. Furthermore, a plate-shaped battery-mounting portion 51 may be provided at a lower part of the grip 30. The battery-mounting portion 51 may extend from the lower part of the grip 30 in the forward direction. A motor housing 20 may be fixed to the upper front surface of the battery-mounting portion 51.

A battery pack 52 may be attached to a lower surface of the battery-mounting portion 51. Though not shown in the figures, a pair of rail portions for mechanically connecting the battery pack 52 and a positive and negative terminal for electrically connecting the battery pack 52 may be provided at the lower surface of the battery-mounting portion 51. The battery pack 52, which is formed by lithium-ion batteries and outputs a voltage of 14.4 volts, may be slid forward to attach to the battery-mounting portion 51 and rearward to detach from the battery-mounting portion 51. The battery pack 52 can be repeatedly used by removing from the battery-mounting portion 51, recharging with a dedicated charger, and attaching the battery pack 52 to the battery-mounting portion 51 again after the charge is completed. The battery pack 52 may be optimized for general/conventional use, and may be a battery pack used as a power source to drive a screwdriver, a cutting tool, and other electric power tools.

A controller 53 that includes a control circuit board for controlling the electric motor 21 and a power supply circuit board may be housed inside the battery-mounting portion 51. The power supply unit 50 may comprise the battery-attaching portion 51, the battery pack 52, and the controller 53. A U-shaped hook 54 may be provided at a lateral side of the battery-mounting portion 51. By appropriately affixing the hook 54 to a work shelf or a stepladder, the driving tool 1 may be kept upside down in a hanged manner.

The main body housing 11, the motor housing 20, the grip 30, and the housing of the battery-attaching portion 51 may be configured such that a left and right half-split housing thereof, each of which is integrally formed by resin, is joined together by a plurality of fixing screws 25.

The magazine 40 may load a plurality of driven members T that are temporarily held in a plate-shaped manner in parallel to each other, and may supply a single driven member T by pitch-feeding the member through the driving passage based on a driving operation of the tool main body 10.

According to the driving tool 1 of the present embodiment as described above, durability of the rack and pinion mechanism 80 can be improved by reducing an impact applied to mainly engaging teeth 81a, 82a, 83a, and 86a of the rack and pinion mechanism 80. In the present embodiment, the elastic member 84 that can be elastically deformed in the rotational directions may be provided between the driving-side pinion gear 83 and the drive-side pinion gear 86 that are rotatable relative to each other within the predetermined angle range.

Because of the construction of the driving tool 1, even in a case where the weight device 5 is retracted to reach the retreat end position by an inertia force of the weight device 5 a few moments after the driver 3 reaches the advancing end position thereof to stop moving, the driving-side pinion gear 83 and the driven-side pinion gear 86 may be rotated relative to each other to elastically deform the elastic member 84. Accordingly, an impact applied mainly to the engaging teeth 81a, 82a, 83a, and 86a of the rack and pinion mechanism 80 may be elastically absorbed. As a result, durability of the rack and pinion mechanism 80 can be further improved.

Furthermore, in the present embodiment, the backlash 80a (the gap between the teeth 81a and 83a) between the driving-side rack gear 81 and the driving-side pinion gear 83 and the backlash 80b (the gap between the teeth 82a and 86a) between the driven-side rack gear 82 and the driven-side pinion gear 86 may be appropriately set. Because of these settings, durability of the rack and pinion mechanism 80 can be improved. The backlash 80a and the backlash 80b may be configured to be adequately large such that the weight device 5 reaches the retreat end position when an engaging state of the abutted engaging teeth moves by retracting the weight device 5 in a direction opposite to the driving direction, where this action occurs after the driver 3 reaches the moving end position in the driving direction to stop moving (at its advancing end position, after the striking frame 3 contacts the advancing end damper 19 to stop). The backlash 80a and the backlash 80b may be larger than that of the involute gear generally used.

In this way, due to the backlash 80a of the driving-side rack gear 81 with respect to the driving-side pinion gear 83 and the backlash 80b of the driven-side rack gear 82 with respect to the driven-side pinion gear 86, the idling movement of the weight device 5 by the inertial force thereof after the driver 3 stops can occur. Because of this construction, an excessive external force may not be applied to the rack and pinion mechanism 80, and thus durability thereof can be improved.

Figure 19:
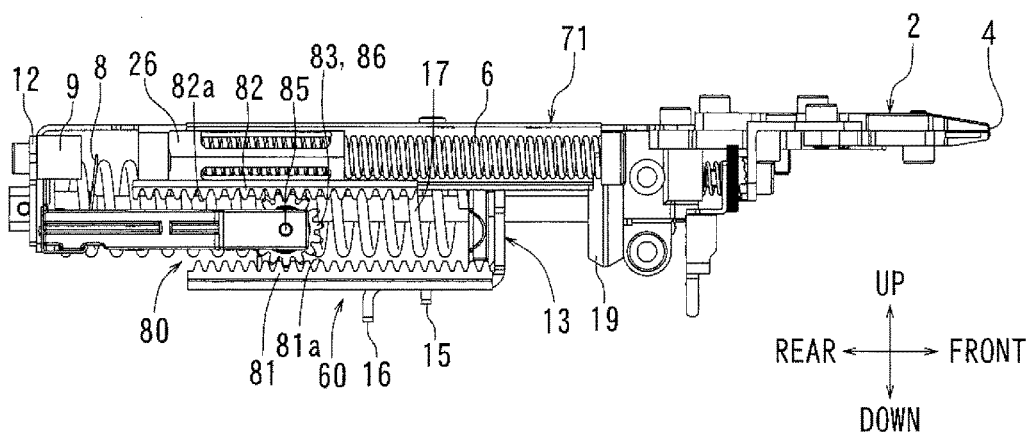
FIG. 19 is a side view of the striking mechanism according to a second exemplary embodiment of the present disclosure, showing a state in which the weight device is retracting to the retreat end position thereof.
Figure 20:
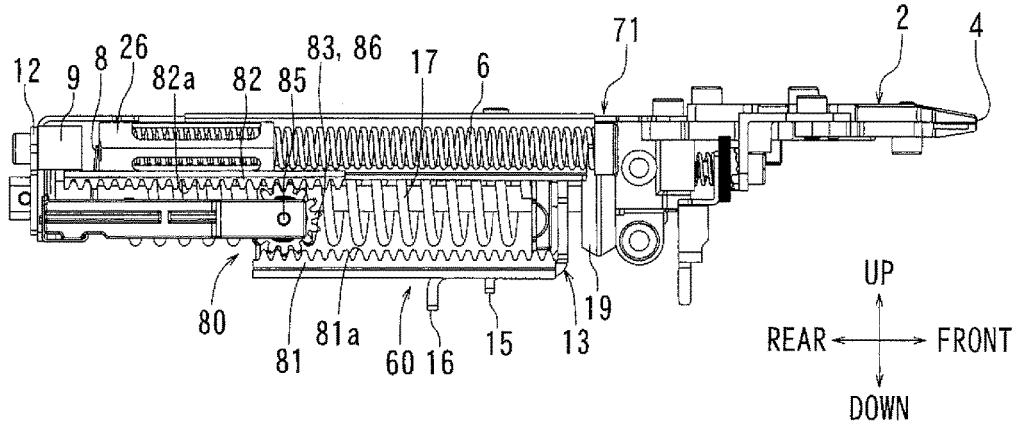
FIG. 20 is a side view of the striking mechanism according to the second exemplary embodiment, showing a state in which the weight device is brought into contact with an auxiliary damper.
Figure 21:
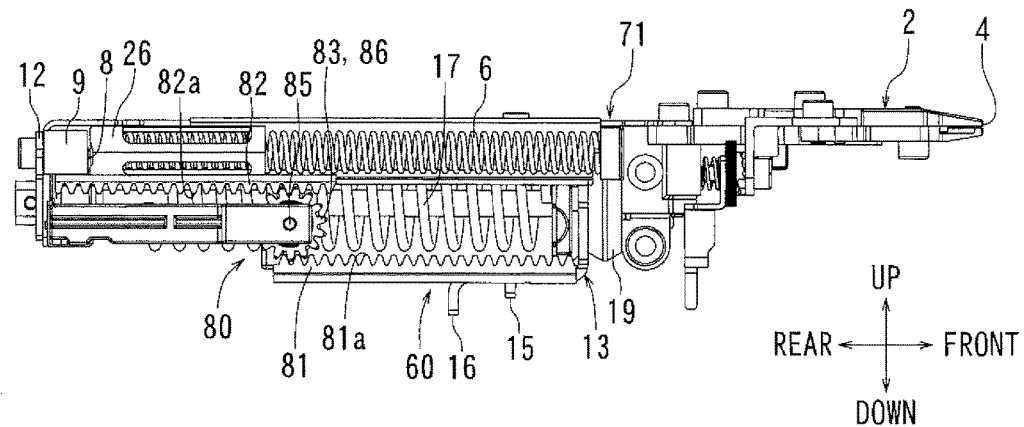
FIG. 21 is a side view of the striking mechanism according to the second exemplary embodiment, showing a state in which the weight device reaches a striking stand-by position.

FIGS. 19 to 21 show a striking mechanism 71 according to a second embodiment in which another method to absorb an impact caused by a movement of the weight device 5 may be adopted. The striking mechanism 71 of the second embodiment may differ from the striking mechanism 70 of the first embodiment in that an auxiliary damper 8 for absorbing the impact caused by the retracting movement of the weight device 5 is provided. Descriptions of the members and configurations in common with the first embodiment may be omitted by using the same reference numerals.

In the first embodiment, the retracting end damper 7 may be attached to the rear face of each weight device 5. However, in the second embodiment, as shown in FIG. 19, the retracting end damper 9 for restricting the retracting movement of the weight device 26 may be attached to the main frame 12. A pair of retracting end dampers 9 may be attached to the main frame 12. Furthermore, in the second embodiment, a leaf spring (plate spring) may be provided as an auxiliary damper 8. The auxiliary damper 8 may be arranged between the left and right retracting end damper 9. Furthermore, the auxiliary damper 8 may be arranged to stand upward from a bottom portion of the main frame 12 in front of the retracting end damper 9.

As described earlier, a striking operation may be performed by the advancement of the striking frame 13 caused by the biasing force of the striking spring 17 via the state shown in FIG. 6. The striking frame 13 may synchronously move in the direction opposite to the direction in which the weight device 26 moves by the rack and pinion mechanism 80, and accordingly when the striking frame 13 advances, the weight device 26 may be retracted by the biasing force of the return spring 6. The weight device 26 may thus be brought into contact with the auxiliary damper 8 as shown in FIG. 20 via a state shown in FIG. 19. Subsequently, due to its inertial force in the rearwards direction, the weight device 26 may contact the retracting end damper 9 as shown in FIG. 21.

By the retracting movement of the weight device 26, a counterforce in the rearward direction that the driving tool 1 receives when the driving operation is performed may be absorbed. As described above, the movement at the advancing end position of the striking frame 13 may be restricted by the contact of the striking frame 13 to the advancing end damper 19, and the impact that the driving tool 1 receives when the striking frame 13 contacts the advancing end damper 9 may be absorbed by elastic deformation of the advancing end damper 19. At the other end, the retracting end position of the weight device 26 may be restricted by the contact of the weight device 26 to the retracting end damper 9, and the impact that the driving tool 1 receives when the weight device 26 contacts the advancing end damper 9 may be absorbed by elastic deformation of the damper 9. Furthermore, just before the weight device 26 contacts the retracting end damper 9, the inertial force of the weight device 26 in the retracting direction may be absorbed by the auxiliary damper 8.

In this way, the inertial force of the weight device 26 in the retracting direction and the biasing force of the return spring 6 may be absorbed by the auxiliary damper 8, and accordingly the retracting speed of the weight device 26 may be reduced. In this manner, the weight device 26 may contact the retracting end damper 9 at a reduced speed. As a result, the inertial force of the weight device 26 in the retracting direction and the biasing force of the return spring 6 may be absorbed by the two stages, i.e., by one stage comprising the auxiliary damper 8 and another stage comprising the retracting end damper 9. Thus, the impact applied to the rack and pinion mechanism 80 can be safely and reliably reduced, and durability thereof can be improved.

Figure 22:
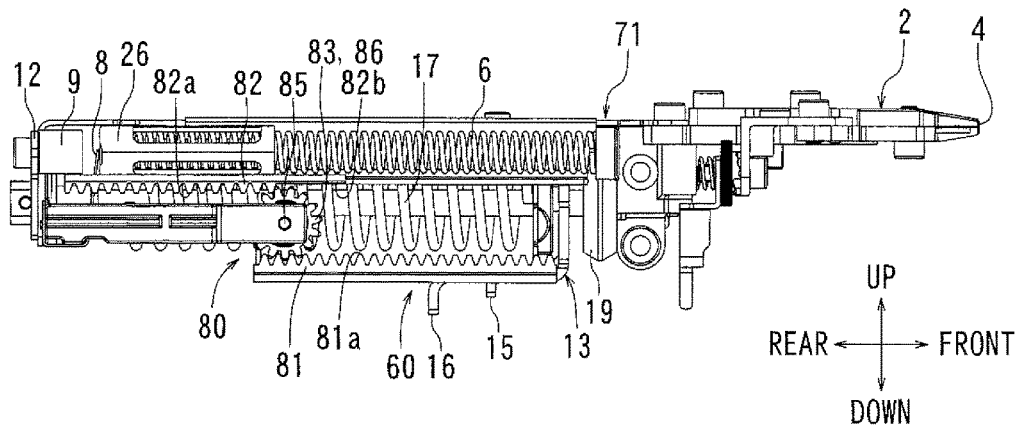
FIG. 22 is a side view of the striking mechanism according to a third exemplary embodiment of the present disclosure, showing a state just before the driven-side rack gear is disengaged with the driven-side pinion gear when the weight device is brought into contact with the auxiliary damper.

FIG. 22 shows a striking mechanism 71 according to a third embodiment. In the third embodiment, a further modification may be added to the second embodiment. In particular, the front of the driven-side rack gear 82 may comprise a tooth-less portion 82*b* in which engaging teeth 82*a* are not present (where the length of rack gear 82 stays the same but the length of the toothed portion becomes shorter). The tooth-less part 82*b* may be configured such that after the weight device 26 contacts the auxiliary damper 8 during the retracting movement of the weight device 26, the driven-side pinion gear 86 may disengage from the driven-side rack gear 82, as shown in FIG. 22. In the third embodiment, five engaging teeth 82*a* of the driven-side rack gear 82, which are located in the front area in the second embodiment, may be omitted, where instead this portion comprises the tooth-less part 82*b*.

Because of the presence of the tooth-less part 82*b*, after the weight device 26 contacts the auxiliary damper 8, the driven-side rack gear 82 may be disengaged from the drive-side pinion gear 86 (the power transmission route through the teethed engagement may be cut off). Accordingly, while the weight device 26 moves to the retracting end position by the inertial force of the weight device 26 and the biasing force of the return spring 6, an excessive external force may not be applied to the driven-side pinion gear 86, and eventually the driving-side pinion gear 83 and the driving-side rack gear 81. In this respect, durability of the rack and pinion mechanism 80 may be safely and reliably improved.

In the third embodiment, elastic force of the auxiliary damper 8 may be set to be larger than that of the return spring 6. Because of this setting, after the weight device 26 reaches its retracting end position by the inertial force of the weight device 26 and the biasing force of the return spring 6 and the inertia force is completely absorbed, the weight device 26 may be returned to a position shown in FIG. 22 by the biasing force of the auxiliary damper 8. When the weight device 26 is returned to the position shown in FIG. 22 by the biasing force of the auxiliary damper 8, the engaging teeth of the driven-side rack gear 82 may be engaged again with the driven-side pinion gear 86. Because of this construction, the driving-side rack gear 81 may start to be retracted by the running of the electric motor 21. As a result, the driving-side pinion gear 83 and the driven-side pinion gear 86 may rotate counterclockwise, and therefore, according to the engaging state of the engaging teeth 86*a* of the driven-side pinion gear 86 with the engaging teeth 82*a* of the driven-side rack gear 82, the striking frame 13 may advance. In this way, a movement failure caused by the presence of the tooth-less part 82*b* is prevented from occurring.

According to the second embodiment as described above, the inertial force of the weight device 26 during the retracting movement may be configured to be absorbed in two stages, i.e., by the auxiliary damper 8 and the retracting end damper 9. Because of this construction, an excessive external force may not be applied to the rack and pinion mechanism 80, and thus durability of the rack and pinion mechanism 80 can be improved.

Furthermore, by the use of the leaf spring that can be elastically displaced with a relatively large amplitude, the inertial force of the weight device 26 during the retracting movement can be absorbed, and the retracting speed of the weight device 26 can be reduced safely and reliably. In this respect, an excessive external force may not be applied to the rack and pinion mechanism 80, in turn increasing overall safety and reliability.

According to the driving tool 1 of the third embodiment, when the weight device 26 receives an elastic resistance of the auxiliary damper 8 during the retracting movement of the weight device 26 in a direction opposite to the driving direction, the teeth of the driven-side rack gear 82 may be configured to be disengaged with the driven-side pinion gear 86. Because of this construction, while the weight device 26 is retracted to its retracting end position due to the inertial force of the weight device 26 and the biasing force of the return spring 6, due to the disengagement of gear teeth the power transmission route between the driven-side pinion gear 86 and the driven-side rack gear 82 may be cut off. Thus, an excessive external force may not be applied to the engaging teeth 86*a* of the driven-side pinion gear 86, and eventually, the engaging teeth 83*a* of the driving-side pinion gear 83 and the engaging teeth 81*a* of the driving-side rack gear 81. As a result, durability of the rack and pinion gear 80 can be improved, in turn increasing overall safety and reliability.

The present invention is not limited to the embodiments discussed above and may be further modified without departing from the scope and spirit of the present teachings. For example, in the embodiments discussed above, the driving force of the driving-side rack gear 81 may be transmitted to the driven-side rack gear 82 by the two pinion gears, i.e., the driving-side pinion gear 83 and the driven-side pinion gear 86. However, an integrated pinion gear can be used between the rack gears 81 and 82. Even in a case where the integrated pinion gear is used, a similar effect may be obtained by setting the backlashes 80*a* and 80*b* between the driving-side rack gear and the driven-side rack gear as described above.

Furthermore, in the embodiments discussed above, the gear diameter and the number of teeth of the driving-side pinion gear 83 may be the same as those of the driven-side pinion gear 86. However, by setting a different gear diameter and a different number of teeth to each other, a stroke of the driver 3 may be configured to be different from that of the weight device 5 (weight device 26). For example, by reducing the gear diameter or the number of teeth of the driven-side pinion gear 86 with respect to the driving-side pinion gear 83, the stroke of the weight device 5 (weight device 26) can be configured to be smaller than that of the driver 3. Because of this setting, the size of the driven-side pinion gear 86 can be reduced and also a resistance with respect to the movement of the driver 3 may be reduced. On the contrary, by increasing the gear diameter or the number of teeth of the driven-side pinion gear 86 with respect to the driving-side pinion gear 83, the stroke of the weight device 5 (weight device 26) can be larger than that of the driver 3. Because of this construction (and the function of the elastic member 84), an impact-absorption capability of the weight device 5 (weight device 26) may be improved.

Figure 23:
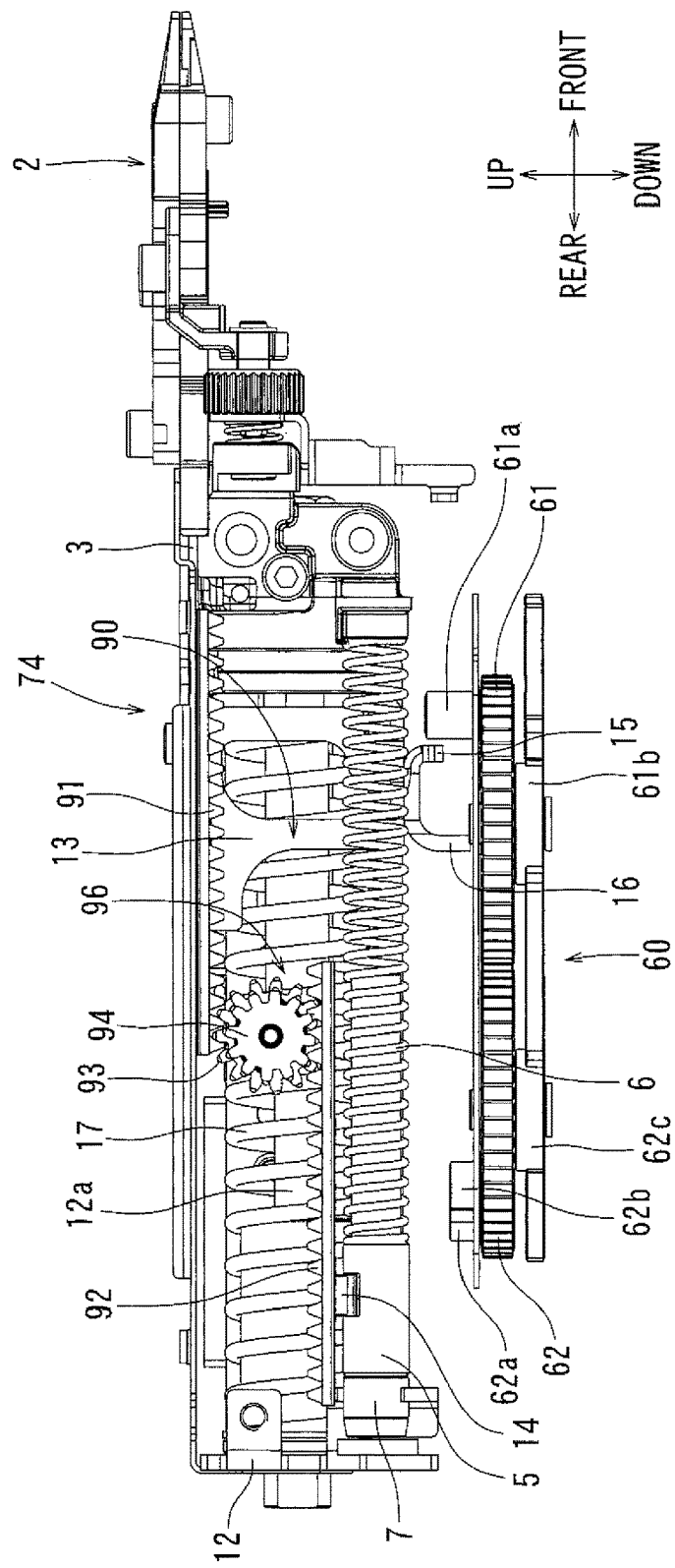
FIG. 23 is a side view showing a driving mechanism and a striking mechanism according to a fourth exemplary embodiment of the present disclosure.

FIG. 23 shows a rack and pinion mechanism 90 according to a fourth embodiment in which the driving-side pinion gear has a different gear diameter and different number of teeth from the driven-side pinion gear. The rack and pinion mechanism 90 according to the fourth embodiment may be configured such that the number of teeth of the driving-side pinion gear 93 is larger than that of the driven-side pinion gear 94. Descriptions of the members and configurations in common with the other embodiments may be omitted by using the same reference numerals.

In the fourth embodiment, the driving-side rack gear 91 may be arranged along an upper side of the main frame 12, and the driven-side rack gear 92 may be arranged along a lower side of the main frame 12. In other words, the driving-side rack gear 91 and the driven-side rack gear 92 of the fourth embodiment may be located in a reversed manner with respect to the first to third embodiments. Because of this construction, as shown in FIG. 23, the weight device 5 and the return spring 6 may be arranged below the pinion gear 96 in the striking mechanism 74 of the fourth embodiment. In other words, the left and right weight device 5 may be arranged below the main frame 12. The left and right weight device 5 that project in the left and right directions may be located below the main frame 12. Because of this construction, compactness of the tool main body 10 in the left and right directions may be realized.

Figure 24:
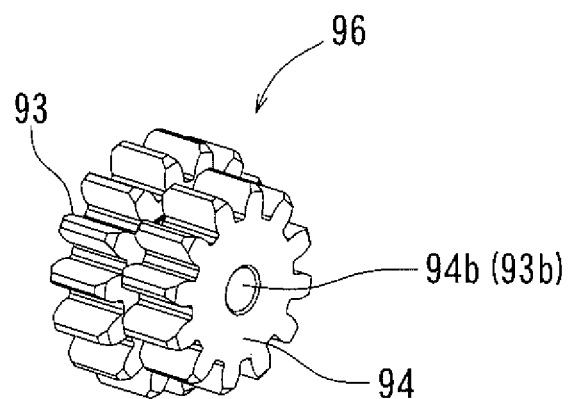
FIG. 24 is a perspective view of a pinion gear according to the fourth exemplary embodiment.
Figure 25:
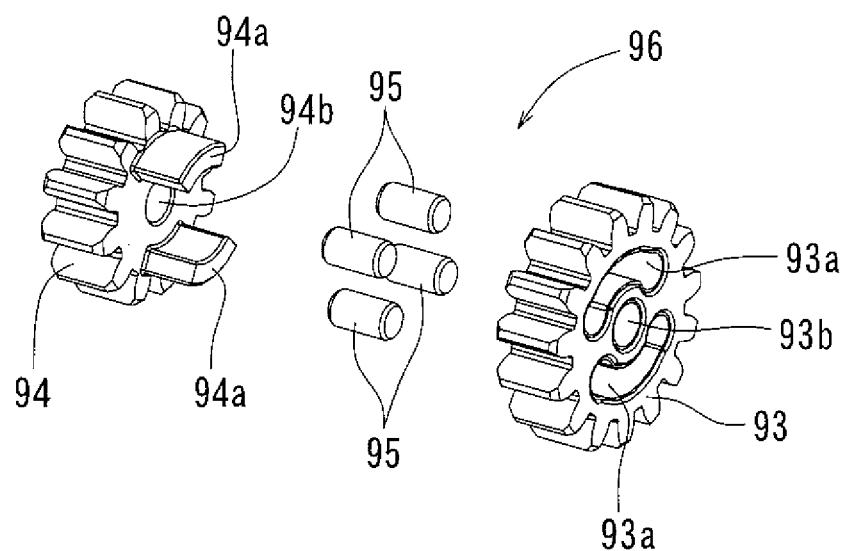
FIG. 25 is an exploded perspective view of the pinion gear according to the fourth exemplary embodiment.

As shown in FIGS. 23 to 25, the pinion gear 96 of the fourth embodiment may be configured such that the driving-side pinion gear 93 may be coaxially joined to the driven-side pinion gear 94 via a plurality of elastic members 95. A spur gear with fifteen teeth may be used in the driving-side pinion gear 93 and a spur gear with twelve teeth may be used in the driven-side pinion gear 94. The driving-side pinion gear 93 may be engaged with the driving-side rack gear 91. The driving-side rack gear 91 may be attached to the striking frame 13 along the lateral sides thereof. The driven-side pinion gear 94 may be engaged with the driven-side rack gear 92. A pair of the driven-side rack gears 92 may be attached to the weight base 14 along the lateral sides thereof. Furthermore, the cylindrical-shaped weight device 5 may be attached to the lower surface of each side of the weight base 14. The return spring 6 may be loaded between the left and right weight devices 5 and the front portion of the main frame 12, respectively, on both the left and right sides. Accordingly, the arrangement of the return spring 6 in the fourth embodiment may be the same as that of the first to third embodiments.

By having the driving-side pinion gear 93 with the fifteen teeth and the driven-side pinion gear 94 with the twelve teeth, a reduction ratio of 1.25 may be obtained for the pinion gear. Further, because the gear is constructed in this manner, the moving distance (stroke) of the driven-side rack gear 92 may be configured to be 80 percent of that of the driving-side rack gear 91. In the fourth embodiment, the backlash 80a (gap 80a) of the driving-side rack gear 91 with respect to the driving-side pinion gear 93 and the backlash 80b (gap 80b) of the driven-side pinion gear 94 with respect to the driven-side rack gear 92 may be appropriately set in the same way as in the first to third embodiments.

As shown in FIG. 25, four tubular-shaped rubber pins may be used as the elastic members 95 in the pinion gear 96 of the fourth embodiment. In the driving-side pinion gear 93, two arc-shaped retention holes 93a may be arranged opposite to each other around the support hole 93b that is located at the center of the gear 93. Furthermore, as shown in FIG. 25, two arc-shaped engaging portions 94a may be provided integral with the driven-side pinion gear 94 around the support hole 94b that is located at the center of the gear 94, such that the two engaging portions 94a oppositely face each other along the up-down axis and extend in an orthogonal direction from the flat surface of the driven-side pinion gear 94. Furthermore, the two engaging portions 94a may be inserted to each of the retention holes 93a of the driving-side pinion gear 93 in a condition where the driving-side pinion gear 93 is joined to the driven-side pinion gear 94. Furthermore, an elastic member 95 may be held (sandwiched) between each end of the engaging portion 94a and the retention hole 93a.

The driving-side pinion gear 93 and the driven-side pinion gear 94 may be relatively rotated with respect to each other in a range where the engaging portion 94a is able to rotate around the retention hole 93a with the four elastic members 95 in total being elastically deformed. By rotating the driving-side pinion gear 93 relative to the driven-side pinion gear 94 with the four elastic members 95 being deformed, when one of the driving-side rack gear 91 and the driven-side rack gear 92 stops moving, the other may be allowed to elastically move. After the driving-side rack gear 91 stops by the striking operation, the idle traveling distance 71 of the weight device 5 due to the inertial force may be obtained in the same way as in the first to third embodiments, and thus the counterforce when the striking operation is performed may be absorbed. Accordingly, the effect of the idle traveling distance in the fourth embodiment may be the same as that of the first to third embodiments.

According to the pinion gear 96 of the fourth embodiment discussed above, the number of teeth (fifteen) of the driving-side pinion gear 93 may be set to be larger than that (twelve) of the driven-side pinion gear 94, and thus the moving distance of the weight device 5 may be set to be shorter than that of the driver 3. In the fourth embodiment, the similar impact-absorption capability to the first to third embodiments can be maintained, and also the moving distance of the weight device 5 can be made shorter than that of the other embodiments. Thus, the degree of freedom in the arrangement of the pinion gear can be increased, while compactness of the tool main body 10 can be obtained.

In the fourth embodiment discussed above, the number of teeth of the driving-side pinion gear 93 may be set to be larger than that of the driven-side pinion gear 94, and the movement of the driving-side rack gear 91 may transfer to the driven-side rack gear 92 such that the moving distance of the driving side rack gear 91 may be shorter than that in the other embodiments (reduced speed). However, the number of teeth of the driving-side pinion gear may be set to be smaller than that of the driven-side pinion gear, and a moving distance of the driven-side rack gear may be larger than that of the driving side rack gear (increased speed).

As discussed above, the number of teeth of the driving-side pinion gear may be set to be different from that of the driven-side pinion gear in order to obtain a speed change function in the rack and pinion mechanism. Other than this method, the similar function may be obtained by setting different gear diameter or module from each other.

Furthermore, as discussed above, the pinion gear having the speed change function may be configured such that the gear diameter or the number of teeth of the driving-side pinion gear may be different from those of the driven-side pinion gear. Other than this construction, the pinion gear may be configured such that the driving-side pinion gear may be integrally formed with the driven-side pinion gear.

Furthermore, in the first embodiment to the fourth embodiment, the striking frame 13 may be retracted in a large movement manner comprising two stages, i.e., the first driving gear 61 comprising a first stage and the second driving gear 62 comprising a second stage. However, the striking frame may be retracted in a shorter movement manner than the exemplified embodiments by using only one driving gear. Accordingly, a compact and smaller sized driving tool can be obtained.

Furthermore, the driving tool 1 may be electrically powered by the battery pack 52 (DC power source), but the present teaching may be applied to the driving tool 1 in a case where power may be supplied to the driving tool 1 by an AC power source such as a 100V commercial power source.

What is claimed is:

1. A driving tool comprising:
   a driver that strikes a driven member when moved in a driving direction;
   a weight device that moves in a direction opposite to a moving direction of the driver; and
   a rack and pinion mechanism that is disposed between the driver and the weight device and by which the weight device moves in the direction opposite to the moving direction of the driver, wherein:
   the rack and pinion mechanism includes a driving-side rack gear, a driven-side rack gear, a driving-side pinion gear with which the driving-side rack gear is engaged, and a driven-side pinion gear with which the driven-side rack gear is engaged, the driving-side rack gear is configured to move the driver and the driven-side rack gear is configured to move the weight device;
   the driving-side pinion gear and the driven-side pinion gear are coaxially supported so as to be rotatable relative to each other within a predetermined angle range; and
   an elastic member is interposed between the driving-side pinion gear and the driven-side pinion gear so as to elastically absorb a relative rotation of the driving-side pinion gear with respect to the driven-side pinion gear.

2. The driving tool according to claim 1, wherein, the driving-side pinion gear is configured such that it can transmit rotational driving force to the driven-side pinion gear via the elastic member.

3. The driving tool according to claim 1, wherein:
   the driver has a driving direction end position;
   the weight device has a direction opposite to the driving direction end position; and
   the weight device is configured to reach the direction opposite to the driving direction end position after the the driver reaches the driving direction end position and the driver stops moving.

4. The driving tool according to claim 3, wherein:
   the weight device is able to move to the direction opposite to the driving direction end portion while an engaging state of the driven-side rack gear and driven-side pinion gear changes by an inertial movement of the weight device in the direction opposite to the driving direction after the driver reaches the driving direction end position.

5. The driving tool according to claim 1, wherein:
   a moving end damper is provided to restrict movement of the weight device in the direction opposite to the driving direction as the weight device approaches the direction opposite to the driving direction end position; and
   an auxiliary damper is provided in front of the moving end damper to supply an elastic resistance against the movement of the weight device.

6. The driving tool according to claim 5, wherein:
   the moving end damper comprises an elastic rubber; and
   the auxiliary damper comprises a leaf spring.

7. The driving tool according to claim 5, wherein,
   the driven-side rack gear is configured to disengage with the driven-side pinion gear when the weight device engages the auxiliary damper.

8. The driving tool according to claim 1, wherein:
   the driver has a driver moving distance;
   the weight device has a weight device moving distance; and
   the driver moving distance is different than the weight device moving distance.

9. The driving tool according to claim 8, wherein:
   the driving-side pinion gear has driving-side pinion gear teeth with which the driving-side rack gear is engaged;
   the driven-side pinion gear has driven-side pinion gear teeth with which the driven-side rack gear is engaged;
   there are more driving-side pinion gear teeth than driven-side pinion gear teeth; and
   the weight device moving distance is shorter than the driver moving distance.

* * * * *